Sept. 16, 1930.  E. E. WAGNER  1,776,207
PROJECTING MACHINE
Filed June 29, 1928  10 Sheets-Sheet 2

Sept. 16, 1930.　　　E. E. WAGNER　　　1,776,207

PROJECTING MACHINE

Filed June 29, 1928　　　10 Sheets-Sheet 6

Inventor
E. E. Wagner

By Victor J. Evans
Attorney

Sept. 16, 1930.   E. E. WAGNER   1,776,207
PROJECTING MACHINE
Filed June 29, 1928   10 Sheets-Sheet 7

Inventor
E. E. Wagner
By Victor J. Evans
Attorney

Sept. 16, 1930.  E. E. WAGNER  1,776,207
PROJECTING MACHINE
Filed June 29, 1928    10 Sheets-Sheet 9

Inventor
E. E. Wagner
By Victor J. Evans
Attorney

Patented Sept. 16, 1930

1,776,207

UNITED STATES PATENT OFFICE

EMANUEL E. WAGNER, OF LAMAR, MISSOURI

PROJECTING MACHINE

Application filed June 29, 1928. Serial No. 289,101.

The object of this invention is to provide a machine for displaying pictures in rapid succession either in connection with indoor exhibitions or in connection with outdoor advertising and the like.

A further object is to avoid the sliding of individual pictures off the screen, with an unpleasant interval between the pictures,— by cutting off or dissolving individual views as the light beam is thrown from the slide of one rotary carrier to the next slide on an adjacent carrier, this alternate movement continuing until all the pictures on the two carriers have been shown.

A further object is to provide mechanism which will permit of the operation of the machine automatically, under the control of a time clock.

A further object is to provide for the automatic stopping of the machine when all the pictures have been exhibited, regardless of whether the slides are sufficient in number to fill the carriers or not.

A further object is to provide for continuous operation during the period required for showing the series of pictures, the carriers stopping at no point where slides are omitted.

A further object is to make provision for a power drive and automatic electric control, and for manual operation, under given conditions when the latter is preferred or is more suitable.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:—

The machine includes a plurality of rotary carriers each comprising a circumferential element 10, spokes 11, and a hub portion 12, a circular rack 13 being secured to each carrier and meshing with pinions such as pinion 15. A transverse shaft 16 drives the pinions thru friction clutches 17, the clutch elements slipping when the carriers are retained by engagement of the stops 18 with the latch 19.

Figures 19, 20, 21, 22:
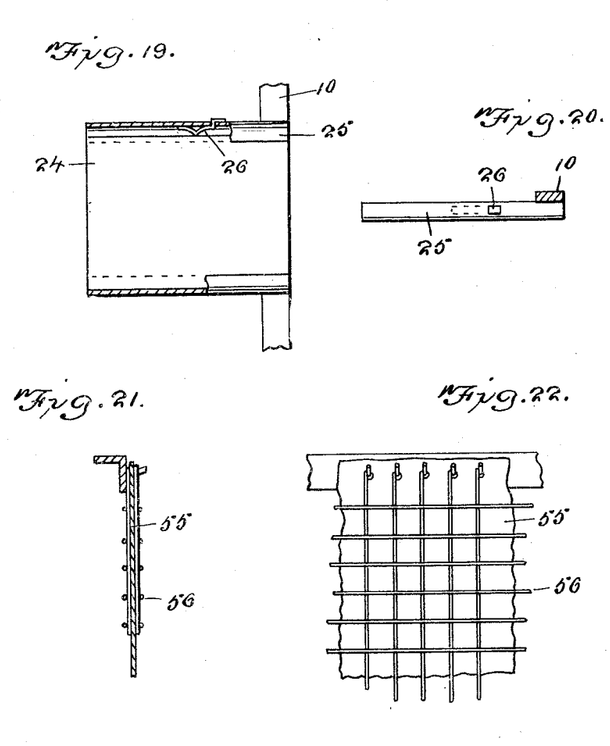
Figures 19 and 20 show details described below.
Figures 21 and 22 are details in section and elevation, of the screen, and reinforcing means therefor.

The clutch elements are held in frictional contact by springs 20 adjustable by means of collars 21 and a screw 22, and the spring engagement is sufficient to insure positive movement of the carriers when they are unobstructed, that is when the latch 19 is out of the path of the stop members 18. A stop is provided for each slide 24, and the slides are mounted in channel elements 25 secured to the carriers and retained by resilient elements 26 shown in Figure 19.

The drive for shaft 16 by means of which motion is imparted to the rotary slide carriers is through chain 27 passing over sprocket wheel 28, and over sprocket wheel 29 on shaft 30. This shaft last named carries a gear wheel 31 meshing with pinion 32 on shaft 33 and shaft 33 carries a worm wheel 34 driven by worm 35 on shaft 30 constituting the armature shaft of motor 37.

When current is not available for driving the electric motor 37, manual drive may be imparted by means of crank 38 carried by shaft 39, the latter mounting sprocket wheel 40 driving chain 41.

This chain passes over sprocket wheel 42 on shaft 30 before mentioned, permitting of manual drive as indicated. In order to change the ratio between gear elements 31 and 32, I mount the latter by means of a spline connection shown at 43, the collar 44 being movable with gear wheel of pinion 32 and being moved by means of arm 45 on lever arm 46 mounted at 47.

Figure 1:
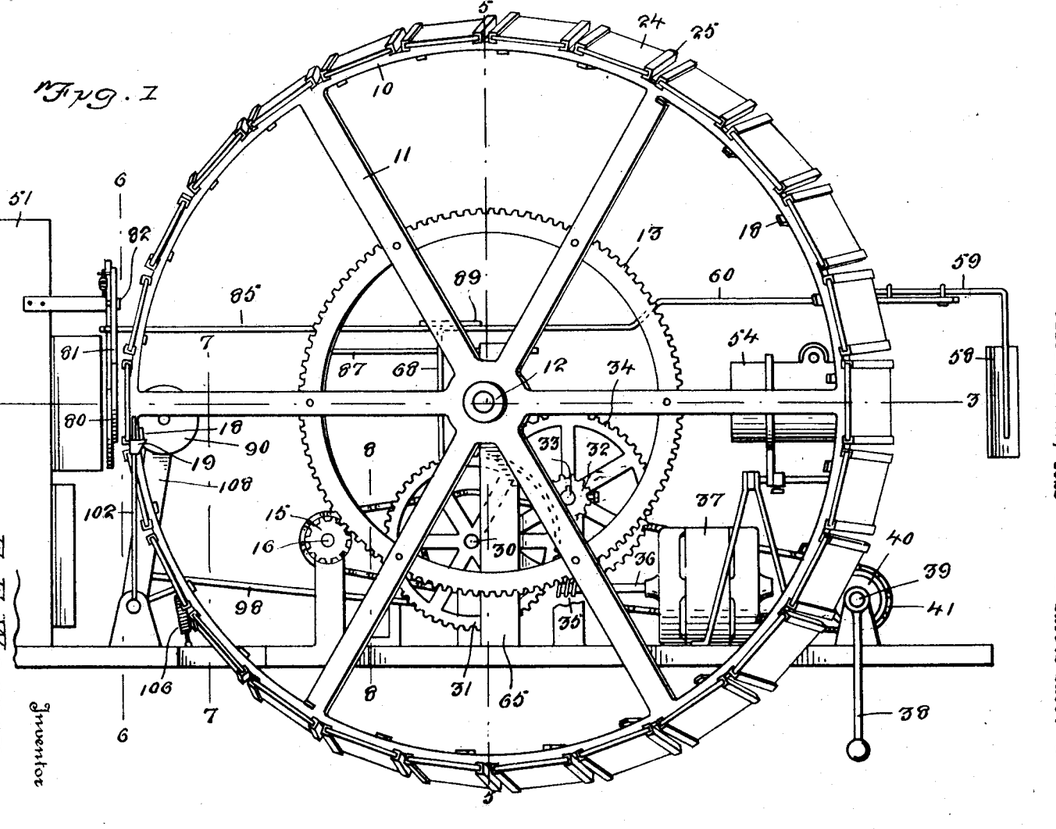
Figure 1 is a view of the machine in side elevation.
Figure 2:
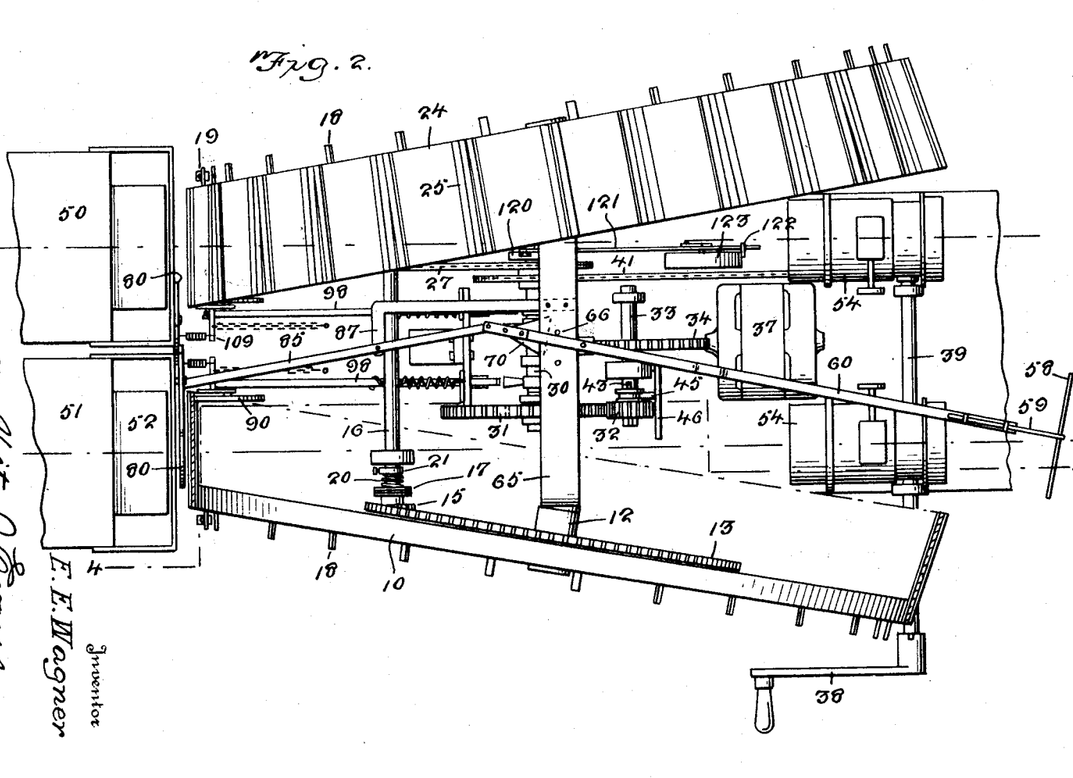
Figure 2 is a top plan view.
Figure 3:
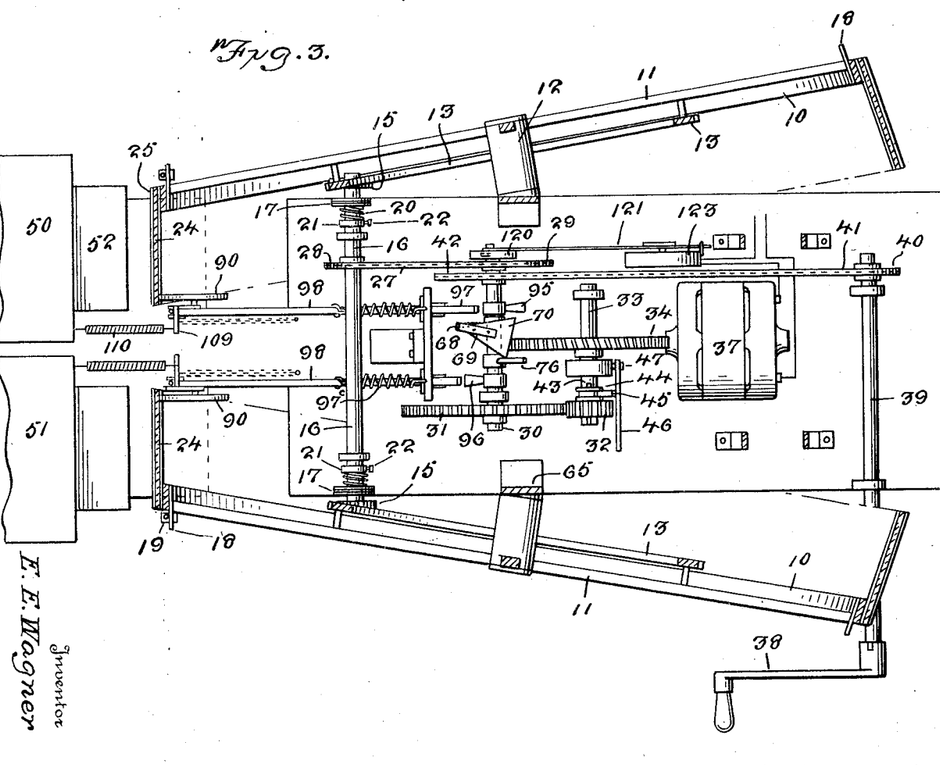
Figure 3 is a section on line 3—3 of Figure 1.
Figure 13:
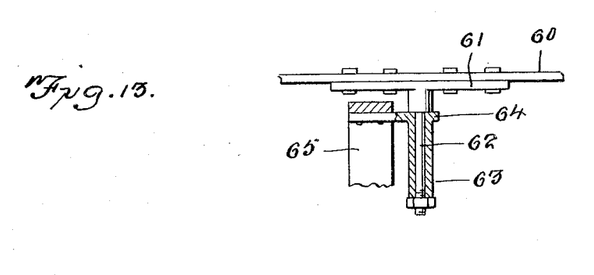
Figure 13 is a detail in section showing the mounting of one of the elements of Figure 1.

A double lamp casing is shown at the left of Figure 3 and includes the casing elements 50 and 51 carrying lens members 52. The light beam is projected, on each side, thru the slide 24 on that side, passing thence thru the lens 54 on each side, the picture being shown on a curtain of the type illustrated in Figures 21 and 22 wherein the flexible element 55 is reinforced on both sides by wires or other similar devices 56, in order to hold the curtain in proper extended position, and prevent movement in the air current, when the device is employed for outdoor advertising. A plurality of dissolvers or cut off devices 58 are adapted to move alternately, on opposite sides, in front of and away from the path of the light beam thru the lenses, in order that the pictures may be shown alternately from opposite rotary slide carriers. These devices 58 are each carried by an arm 59 mounted on bar 60. This bar carries a bracket or the like 61 mounting a vertical pivot pin 62, shown especially in Figure 13, and the pin operates within sleeve 63 forming a part of bracket 64 mounted on a stationary frame 65.

Figure 12:
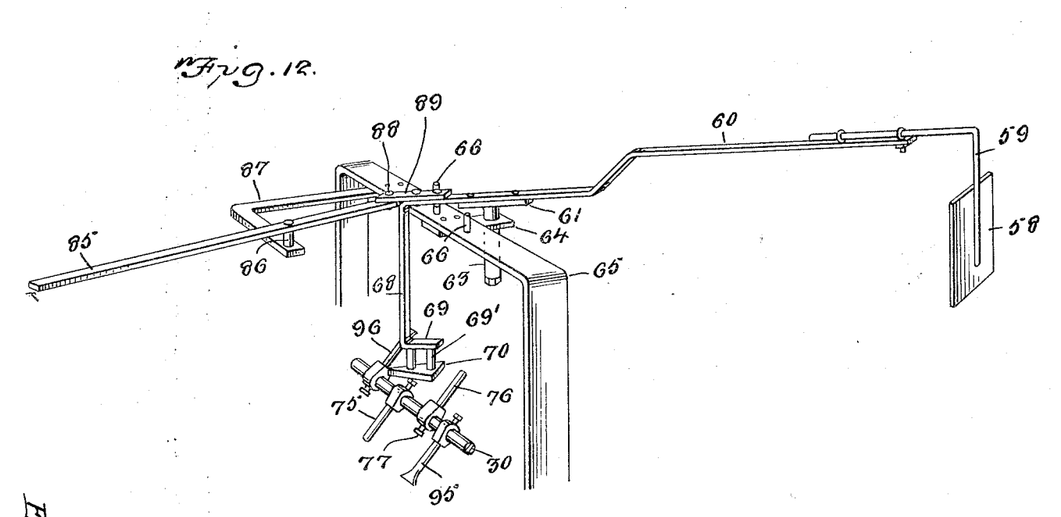
Figure 12 is a perspective view showing the dogs controlling the means for dissolving or screening off a picture of one carrier while that on the oppositely located carrier is being positioned.

This frame is of U form as shown in Figure 12, and stops 66 may be mounted in apertures at different points in order to limit the angular movement of bar 60 about the axis represented by pivot 62, constituting a fulcrum.

Bar 60 carries or has formed thereon a downwardly extending arm 68 laterally deflected at 69 and mounting by means of pins 70 or the like 69′ a plate 70, the latter constituting a shifting device by means of which dissolvers or cut off plates 58 are operated alternately for the purpose of showing pictures, in succession, from oppositely located slide carriers.

Shaft 30 carries fingers 75 and 76 each adjustable by means of a set screw as shown at 77, and these fingers alternately engage the shifting device or plate 70 by means of which the aforesaid movement of the picture dissolving devices 58 is effected. The plate 70 is of triangular form and the edge portions thereof are engaged in an obvious manner by the fingers 75 and 76, the operation being illustrated especially in Figure 12.

Figure 4:
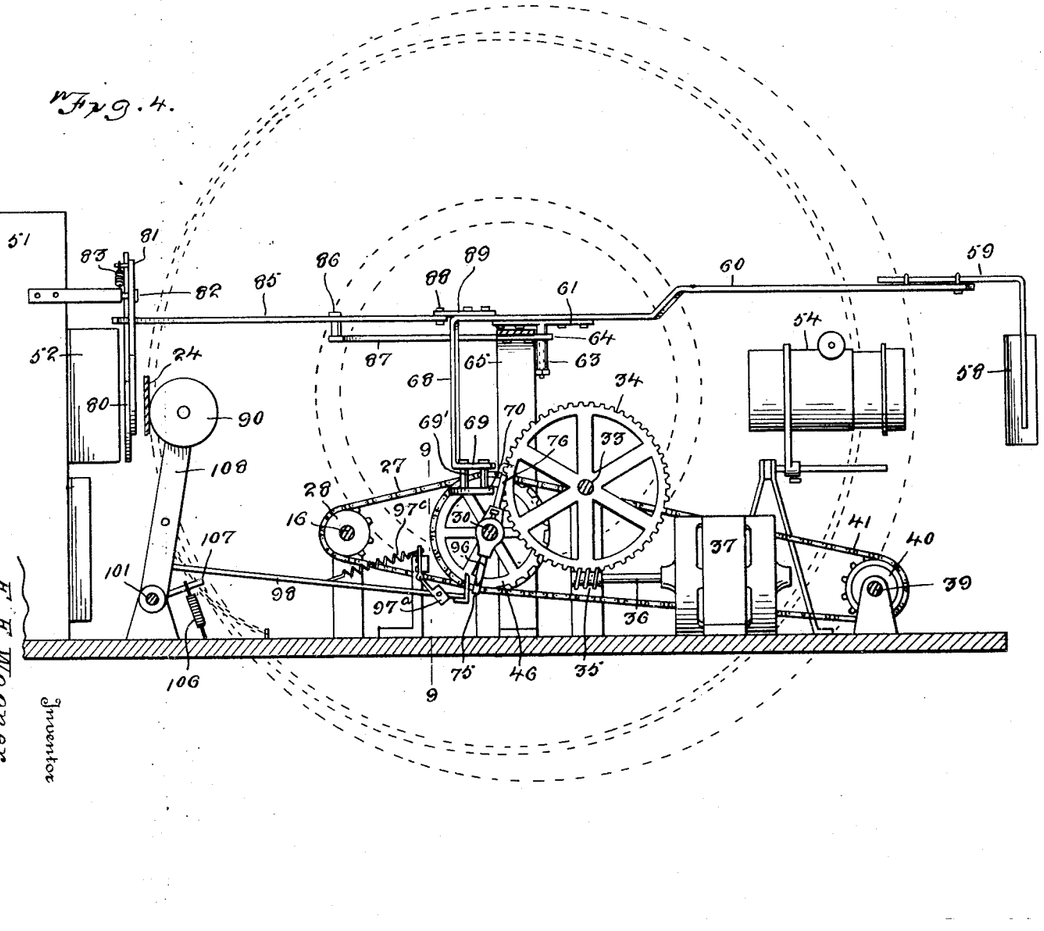
Figure 4 is a section on line 4—4 of Figure 2.
Figure 5:
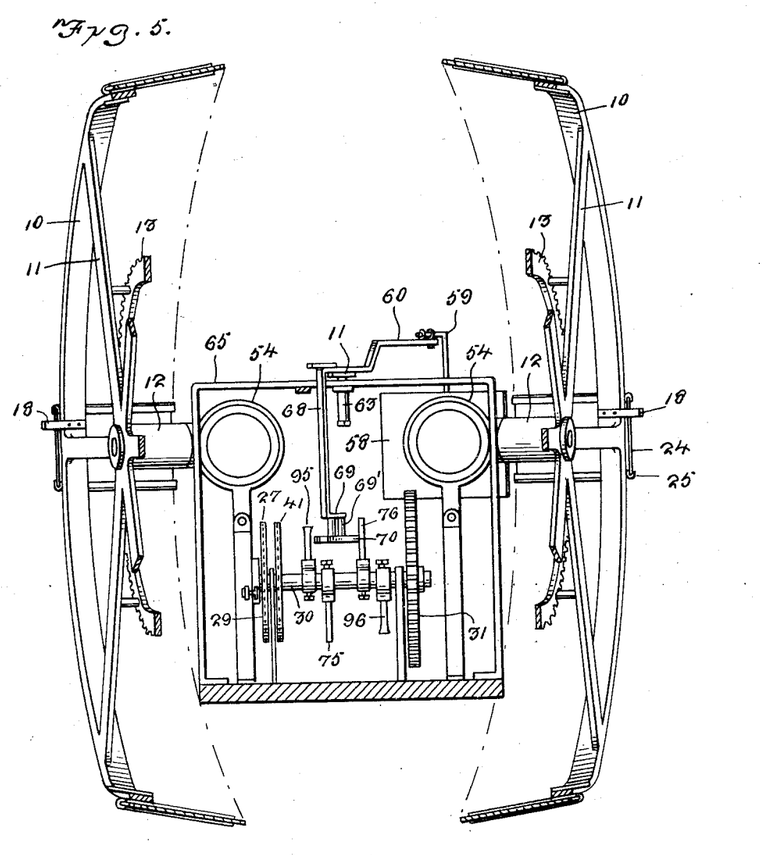
Figure 5 is a section on line 5—5 of Figure 1.
Figure 6:
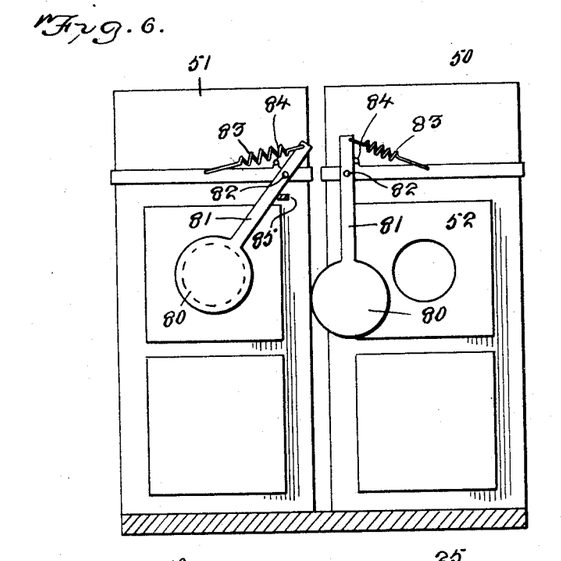
Figure 6 is a section on line 6—6 of Figure 1.
Figure 7:
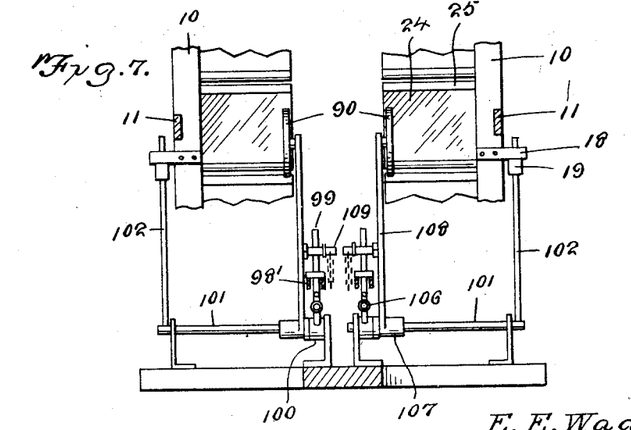
Figure 7 is a section on line 7—7 of Figure 1.
Figure 8:
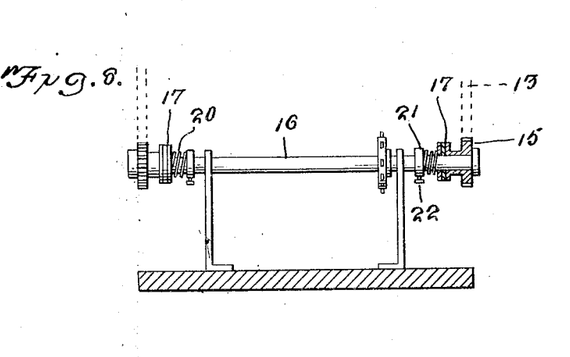
Figure 8 is a section on line 8—8 of Figure 1.
Figure 9:
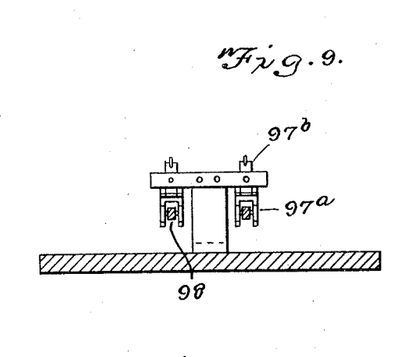
Figure 9 is a section on line 9—9 of Figure 4.

In order to protect the slides from the effect of excessive heat from the lamps in casings 50—51 when the device is used for displaying illustrated song slides, I provide shields which may be of disk form, shown especially in Figures 4 and 6, these shields or disks being designated 80 and being each carried by an arm 81 pivoted at 82 and held by a spring 83 in each instance. Stops 84 limit the movement of the arms 81 and shields or disks 80, and said elements 81 are operated that is are swung laterally as shown in Figure 6, by means of bar 85 pivoted at 86 on a supporting element 87 and pivotally connected at 88 with a bracket 89 secured to bar 60. The swinging movement for bar 85 is thereby secured, in connection with the operation of bar 60 controlling the picture dissolving or cut off devices 58. These elements 58 are timed to expose a slide immediately after the shields have moved from obstructing position.

Figures 14, 15:
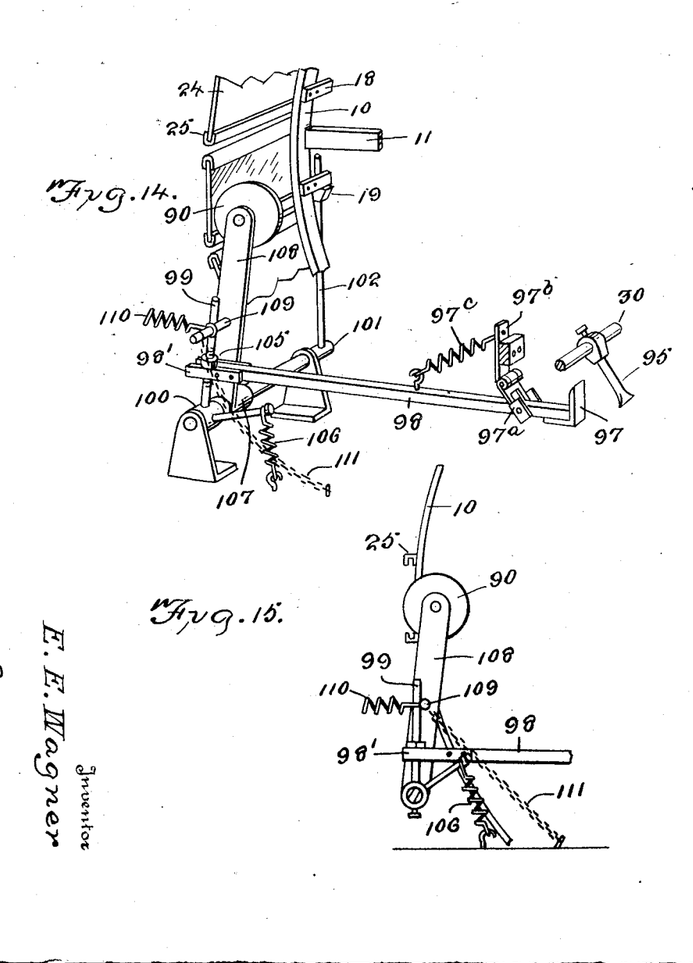
Figure 14 is a perspective view showing a portion of one of the carriers for the slides, stop mechanism, and means preventing the stopping of the carrier when a slide is omitted.
Figure 15 is a detail showing a portion of the mechanism of Figure 14, and especially the roller which has moved to position for preventing stopping of the carrier.

An important feature of the invention is found in the means illustrated in Figure 14 and in other detail views, whereby the absence of a picture slide at any point will have no effect on the result secured, because although stops 18 are to be engaged, under normal conditions, by a latch 19,—if no picture slide is present in any particular slide holding device, roller 90 will pass to the position of Figure 15, and the latch 19 will automatically pass out of the path of the stops 18, and the movement of the carrier will continue for showing the next slide.

Assuming that the latch 19 is, under normal conditions, in the path of stops 18, so that the rotary slide carriers will stop for each slide actually mounted in the frames of the carriers, the fingers 95 and 96 on shaft 30 will engage the brackets 97 on push bars 98, and said bars having their end portions bearing against stud 99 carried by collar 100 rigid with shaft 101, will rock said shaft and the arm 102 carried thereon, the latter mounting the latch 19, whereby at each engagement between a finger 95 or 96 and one of the bars 98, after each slide has been shown, the latch 19 will pass out of engagement with stop 18, and the drive thru shaft 16 and the friction clutches 17 will result in the rotation of the carrier, or that side of the machine, for shifting to a new slide.

In order to prevent the picture from sliding off the screen, it is dissolved out, by means of the devices 58 operating in timed relation to the operation of the bars 98 and the latch and stop mechanism.

The bar 98 on each side, carries guiding elements 98' on each side of stud 99, and the latter carries an adjustable device 105, positioned as shown, said element 99 being limited in its movement by spring 106, normally holding it in the position of Figure 14.

A loose sleeve 107 on shaft 101 has rigid therewith an arm 108 mounting roller 90, serving the purpose before indicated. This arm 108 carries a pin 109 engaging stud 99, and a spring 110 holds pin 109 in engagement with the stud, or tends to move it to the left when swung from the position of Figure 14.

Figure 16:
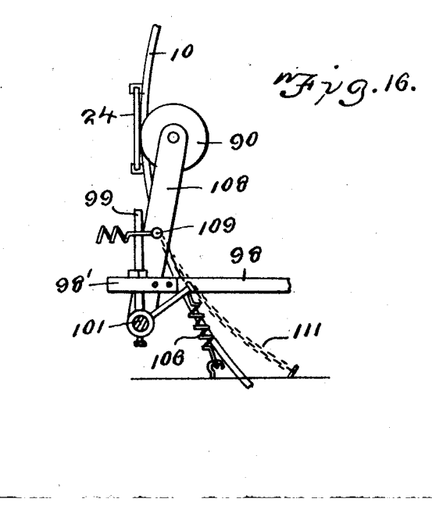
Figure 16 shows the action of the roller under normal conditions.
Figure 17:
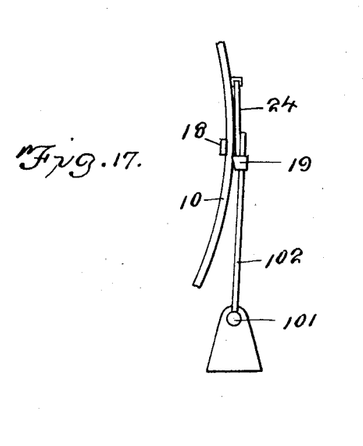
Figure 17 is a detail of the stop means.

Figure 16 shows the operation of the roller under normal conditions, and a chain 111 limits the movement of element, and the roller 90, when the latter tends to pass thru the slide mounting devices in Figure 15, owing to the absence of a slide therein.

Figure 18:
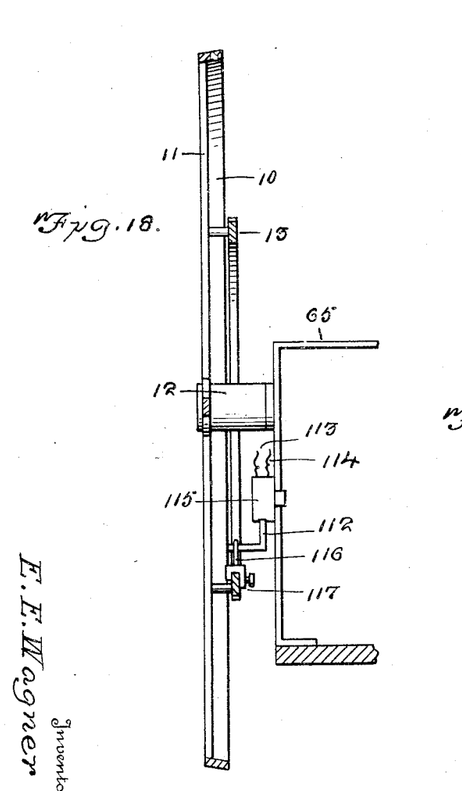
Figure 18 constitutes a section thru the means for effecting automatic control at any given point.

In order to discontinue the current on the motor 37 in the event that there are not sufficient slides to fill the carriers, and in order to effect this operation automatically, I provide a switch, shown in Figure 18 and designated 112, this element being assumed to close and open a circuit represented by wires 113 and 114. The switch casing is designated 115, and the switch arm 112 is thrown when a stop 116 engages the switch, this element 116 being adjustable as shown at 117 on the circular rack 13. When the machine is stopped in the manner indicated, it may be again started throwing in the switch 112 after the carriers have been returned manually to starting position.

In connection with the push bars 98 it may be added that they are retained by hangers such as 97ª, in Figure 14, these devices being pivoted to brackets 97ᵇ. Springs 97ᶜ are secured to the push bars 98, at the point shown, and serve to return such push bars to normal position when operated by fingers 95, 96.

Figure 10:
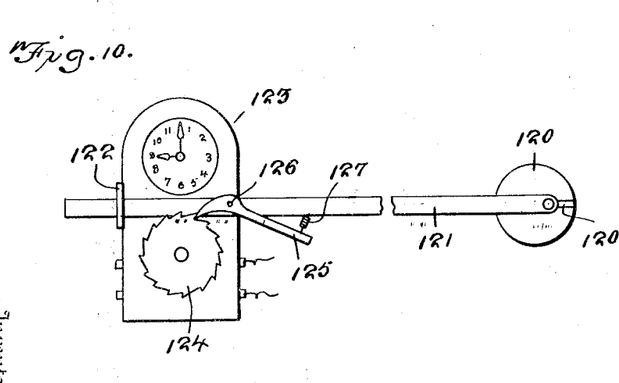
Figures 10 and 11 are views respectively in elevation and plan, showing the time clock control.
Figure 11:
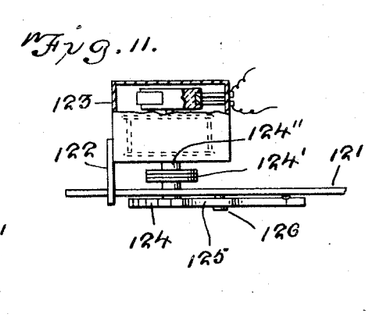

Means for controlling the motor 37 are shown in Figures 3, 10 and 11, and in this connection a slotted disk 120 on shaft 30 is adapted to control arm 121 guided by bracket 122 of the casing 123 of a clock, an element or arbor of which carries a ratchet wheel 124 engaged by feeding pawl 125. This pawl is pivoted at 126 to arm or bar 121, being controlled in part by spring 127.

By these means the motor circuit represented by the wires shown in Figure 10 is made and broken by mechanism of standard commercial type, not shown, but controlled or rendered operative by the number of revolutions imparted to the ratchet wheel 124.

The means for making and breaking the motor circuit constitutes a time controlled switch, and the extent to which the clock mechanism is wound is determined by the fine teeth on the ratchet wheel 124 engaged by feeding pawl 125. The degree of movement of the pawl is controlled by the position of the crank element 120' in the slot of disk 120. A friction clutch 124' on clock arbor 124'' prevents over winding of the clock.

The pictures are to be projected thru the screen 55 instead of being reflected from the screen as in most installations in use, and in outdoor advertising all of the apparatus can be mounted on or in one building, avoiding the necessity of leasing or using a portion of a separate building.

The machine is also adapted to show pictures from either side of the screen.

Having described the invention what is claimed is:—

1. In a device of the class described, a plurality of rotary carriers for mounting picture slides, the axes of rotation being at an angle to each other, means for mounting the slides at an angle to the axes of their respective carriers, the slides of respective carriers being in approximate alignment when in display position, illuminating means positioned to throw parallel beams of light radially of the rotary carriers and outwardly through slides at corresponding portions of the circumference of the two carriers, single means for actuating the two carriers continuously, and mechanism effecting display of a slide on one carrier and the other, alternately.

2. In a device of the class described, a plurality of rotary carriers for mounting picture slides, the axes of rotation being at an angle to each other, means for mounting the slides at an angle to the axes of their respective carriers, the slides of respective carriers being in approximate alignment when in display position, illuminating means positioned to throw parallel beams of light radially of the rotary carriers and outwardly through slides at corresponding portions of the circumference of the two carriers, means for actuating the carriers continuously, mechanism effecting display of a slide on one carrier and the other, alternately, said mechanism including a laterally shiftable device, a driven shaft, and devices on the shaft alternately engaging the shiftable device.

3. In a device of the class described, a plurality of rotatable carriers for mounting picture slides, means for actuating the carriers continuously, and mechanism effecting display of the slides on one carrier and on the other, alternately, said mechanism including an angularly movable device, a driven shaft, and devices on the shaft alternately engaging the angularly movable device, these devices on the shaft moving in parallel planes on opposite sides of the axis about which the angularly movable device operates.

4. In a device of the class described, a plurality of rotatable carriers for mounting picture slides, means for actuating the carriers continuously, and mechanism effecting display of the slides on one carrier and on the other, alternately, said mechanism including an angularly movable device, a driven shaft, devices on the shaft alternately engaging the angularly movable device, illuminating means, and elements actuated by the angularly movable device for shielding the slides from heat from the illuminating means.

5. In a device of the class described, a plurality of rotary carriers for mounting picture slides, the axes of rotation being at an angle to each other, means for mounting the slides at an angle to the axes of their respective carriers, the slides of respective carriers being in approximate alignment when in display position, means for actuating the carriers continuously, mechanism effecting display of the slide on one carrier and the other, alternately, said means last named including an arm, devices for automatically moving the arm about a pivotal point, and picture dissolving means carried by the arm and movable in front of the carriers alternately.

6. In a device of the class described, a slide mounting element, means for rotating said element, means for stopping rotation as each slide moves to display position, and mechanism rendering the stopping means inactive, this mechanism including a latch for engaging the means stopping rotation, means mounting and controlling the position of the latch, and an element connected with the mounting means, yieldingly engaging the mounted slides, and movable into spaces left open by missing slides, for throwing the latch out of operative position.

7. In a device of the class described, a slide mounting element, means for rotating said element, means for stopping rotation as each slide moves to display position, and mechanism automatically operative for rendering the stopping means inactive, this mechanism including a latch for engaging the means stopping rotation, means mounting and controlling the position of the latch, and an element connected with the mounting means, yieldingly engaging the mounted slides, and movable into spaces left open by missing slides, for throwing the latch out of operative position.

8. In a device of the class described, slide mounting mechanism, electric driving means for said mechanism, slide displaying mechanism, mechanical controlling means for the slide displaying mechanism, time controlled switch means thru which the driving means is energized, and mechanism for winding the timing means by the controlling means for the slide displaying mechanism.

In testimony whereof I affix my signature.

EMANUEL E. WAGNER.